(12) United States Patent  (10) Patent No.: US 8,917,289 B2
Fock et al.  (45) Date of Patent: Dec. 23, 2014

(54) METHODS AND ARRANGEMENTS FOR AUGMENTED REALITY

(75) Inventors: Niclas Fock, Linköping (SE); Gert Johansson, Linköping (SE); Anders Åström, Linköping (SE)

(73) Assignee: SAAB AB, Linköping (SE)

( * ) Notice: Subject to any disclaimer, the term of this patent is extended or adjusted under 35 U.S.C. 154(b) by 110 days.

(21) Appl. No.: 13/701,089

(22) PCT Filed: Jun. 1, 2010

(86) PCT No.: PCT/SE2010/050598
§ 371 (c)(1),
(2), (4) Date: Nov. 30, 2012

(87) PCT Pub. No.: WO2011/152764
PCT Pub. Date: Dec. 8, 2011

(65) Prior Publication Data
US 2013/0069986 A1   Mar. 21, 2013

(51) Int. Cl.
*G09G 5/00* (2006.01)
*G06K 9/60* (2006.01)
*G06F 17/30* (2006.01)

(52) U.S. Cl.
CPC .......... *G06K 9/605* (2013.01); *G06K 17/30041* (2013.01); *G06F 17/30047* (2013.01)
USPC ............................ 345/633; 345/419; 382/190

(58) Field of Classification Search
CPC ............................................. G06T 2207/30244
USPC ................................... 345/633, 419; 382/190
See application file for complete search history.

(56) References Cited

U.S. PATENT DOCUMENTS

| | | |
|---|---|---|
| 2005/0011959 A1 | 1/2005 | Grosvenor |
| 2008/0298689 A1 | 12/2008 | Ashbrook et al. |
| 2009/0237546 A1* | 9/2009 | Bloebaum et al. ........ 348/333.01 |
| 2010/0045701 A1* | 2/2010 | Scott et al. ..................... 345/633 |
| 2010/0158355 A1* | 6/2010 | Najafi et al. ................... 382/154 |
| 2010/0208057 A1* | 8/2010 | Meier et al. .................... 348/135 |

FOREIGN PATENT DOCUMENTS

| | | |
|---|---|---|
| JP | 2005038153 A | 2/2005 |
| JP | 2008530676 A | 8/2008 |
| WO | WO-03/032005 A2 | 4/2003 |
| WO | WO-2006/085106 A1 | 8/2006 |
| WO | WO-2008/134901 A1 | 11/2008 |

OTHER PUBLICATIONS

PCT/ISA/210—International Search Report—Feb. 23, 2011 (Issued in PCT/SE2010/050598).

(Continued)

*Primary Examiner* — Maurice L McDowell, Jr
(74) *Attorney, Agent, or Firm* — Venable LLP; Eric J. Franklin

(57) ABSTRACT

A mobile device, a method in a mobile device, a server and a method in a server for augmented reality.

24 Claims, 4 Drawing Sheets

(56) References Cited

OTHER PUBLICATIONS

PCT/ISA/237—Written Opinion of the International Searching Authority—Feb. 23, 2011 (Issued in PCT/SE2010/050598).
PCT/IPEA/408—Written Opinion of the International Preliminary Authority—Jun. 27, 2012 (Issued in PCT/SE2010/050598).
PCT/IPEA/409—International Preliminary Report on Patentability—Oct. 19, 2012 (Issued in PCT/SE2010/050598).
J. Mooser et al.; "Applying Robust Structure from Motion to Markerless Augmented Reality", Workshop on Applications of Computer Vision, 2009.
Japanese Patent Communication—Notice of Reasons for Rejection—Mar. 4, 2014 (With Translation (Issued in Counterpart Application No. P2013-513131).
Supplementary European Search Report—Oct. 1, 2014 (Issued in Counterpart Application No. 10852597.3).
G. Takacs et al.; "Outdoors augmented reality on mobile phone using Loxel-based visual feature organization", Proceedings of the Workshop on Multimedia Information Retrieval (MIRO); Oct. 27, 2008; pp. 427-434.
I Skrypnyk et al.; "Scene Modelling, Recognition and Tracking with Invariant Image Features", Proceedings of the Third IEEE and ACM International Symposium on Mixed and Augmented Reality, Nov. 2, 2004, pp. 110-119.
J. Gausemeier et al.; "Development of a real time image based object recognition method for mobile AR-devices", Proceedings of the 2nd International Conference on Computer Graphics, Virtual Reality, Visualization and Interaction in Africa, Jan. 1, 2003, pp. 133-139.
G. Papagianakis, et al.; "A survey of mobile and wireless technologies for augmented reality systems", Computer Animation and Virtual Worlds, Feb. 1, 2008; pp. 3-22.

* cited by examiner

METHODS AND ARRANGEMENTS FOR AUGMENTED REALITY

CROSS-REFERENCE TO RELATED APPLICATIONS

This application is the national phase under 35 U.S.C. §371 of PCT/SE2010/050598 filed 1 Jun. 2010.

TECHNICAL FIELD

The present invention relates to arrangements and methods for augmented reality, and in particular to methods and arrangements for determining if and how a camera is observing objects in a physical real world environment.

BACKGROUND

Augmented Reality, AR, is live direct or indirect view of a physical real-world environment, where the physical real-world environment is augmented by virtual computer-generated imagery.

Typically a user carries augmented reality goggles through which the user can see the physical real-world environment. At the same time is an image projected in a visual field of the user. In order for the image to be properly experienced by the user the image has to be projected geometrically correct. To enable augmented reality in real time open up a world of possibilities, this will revolutionise many applications such as for instance computer games and other applications.

One problem associated with augmented reality is how to calculate a geographically correct projection of the image in the visual field of the user. Parameters that must be calculated are for instance attitudes, and distances to objects in the physical real-world environment.

In order to implement augmented reality a camera first need to take images of the physical real-world environment that an augmented reality system wants to augment by virtual computer-generated imagery. The augmented reality system then needs to determine what the image depicts and then determine the attitude and the distance to the object in the physical real-world environment. This may for instance be a relation between a position of the camera and the object in three dimensions.

One solution for determining a relation between the position of the camera and the objects has been to use markers with a known pattern that easily can be identified. These markers have been positioned in the physical real-world environment. When the augmented reality system later analyses the images these markers can be identified. The pattern can then be used to calculate the relation between the camera and the markers. This information is then used to determine how the image should be projected geographically correct in the visual field of the user.

A disadvantage with this solution is however that it requires markers in the physical real-world environment.

There is therefore a need for an improved solution for augmented reality, which solution solves or at least mitigates at least one of the above mentioned problems.

SUMMARY

An object of the present invention is thus to provide arrangements and methods for augmented reality that do not require markers in the physical real-world environment.

According to a first aspect the present invention relates a mobile device for augmented reality. The mobile device comprises receiving means configured to receive an image of a physical real world environment taken by at least one camera at a position. The receiving means being further configured to receive the position, an id, where the id being associated with an algorithm to be used on the image to extract a set of features from the image, a stored set of features for the physical real world environment at the position which has been extracted using the algorithm. The mobile device further comprises processing means configured to extract the set of features from the image using the algorithm and to determine if and how the camera is observing an object in the physical real world environment by comparing the stored set of features with the set of features.

Thus, the object according to the present invention is achieved by comparing a stored set of features with a set of features extracted from an image. Comparing a stored set of features with a set of features instead of using entire images makes it possible to use the solution in a mobile environment since is only necessary to transfer the stored set of features or the set of features in a mobile network.

According to a second aspect the present invention relates a method in a mobile device for augmented reality. The method comprises the steps of: receiving an image of a physical real world environment taken by at least one camera at a position; receiving the position; receiving an id associated with the position, the id being associated with an algorithm to be used on the image to extract a set of features from the image; receiving a stored set of features for the physical real world environment at the position which has been extracted using the algorithm; extracting the set of features from the image using the algorithm; and determining if and how the camera is observing an object in the physical real world environment by comparing the stored set of features with the set of features.

According to a third aspect the present invention relates a server for augmented reality. The server comprises receiving means configured to receive a set of features extracted from an image of a physical real world environment taken by at least one camera at a position and the position. The server further comprises retrieving means configured to retrieve an id associated with the position, the id being associated with an algorithm that has been used on the image to extract a set of features from the image, and a stored set of features for the physical real world environment at the position, which has been extracted using the algorithm. Further means in the server is processing means configured to determine if and how said camera is observing an object in the physical real world environment by comparing the stored set of features with the set of features.

According to a fourth aspect the present invention relates to a method in a server for augmented reality. The method comprises the steps of: receiving a set of features extracted from an image of a physical real world environment at a position taken by at least one camera; receiving the position; retrieving an id associated with the position, the id being associated with an algorithm to be used on the image to extract a set of features from the image; retrieving a stored set of features for the physical real world environment at a position, which has been extracted using the algorithm; and determining if and how said camera is observing an object in the physical real world environment by comparing the stored set of features with the set of features.

An advantage with embodiments of the present invention, is that it is possible to implement the solution in a mobile environment since is only necessary to transfer the stored set of features or the set of features in a mobile network instead of entire images.

Yet another advantage with embodiments of the present invention is that less network resources are consumed since only the stored set of features of the set of features need to be transferred.

Yet a further advantage with embodiments of the present invention is that no markers in the physical real world environment are needed.

A yet further advantage with embodiments of the present invention is better real time performance than existing solutions since only features related to images are transferred in the solution instead of entire images.

BRIEF DESCRIPTION OF THE DRAWINGS

The invention will in the following be described in more detail with reference to enclosed drawings, wherein.

DETAILED DESCRIPTION

In the following description, for purposes of explanation and not limitation, specific details are set forth, such as particular sequences of steps, and device configurations in order to provide a thorough understanding of the present invention. It will be apparent to one skilled in the art that the present invention may be carried out in other embodiments that depart from these specific details.

Moreover, those skilled in the art will appreciate that functions and means explained herein below may be implemented using software functioning in conjunction with a programmed microprocessor or general purpose computer, and/or using an application specific integrated circuit (ASIC).

Figure 1:
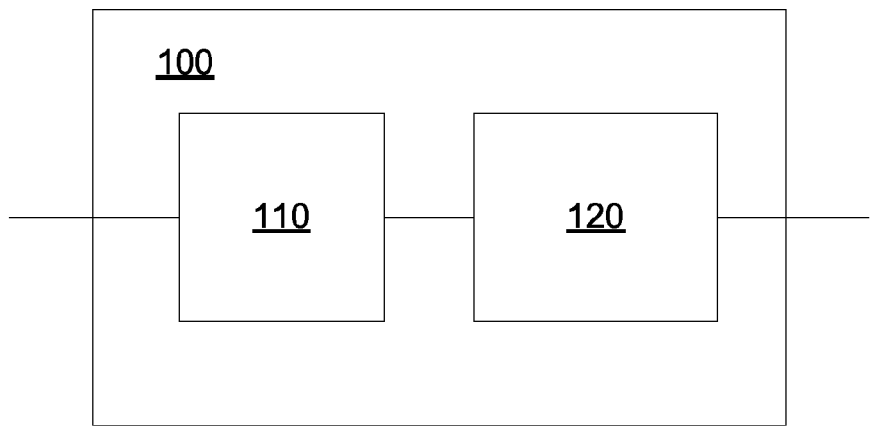
FIG. 1 illustrates schematically a mobile device according to an exemplary embodiment of the invention.

Turning now to FIG. 1, which shows an exemplary embodiment of a mobile device 100 according to the present invention. The mobile device 100 can be a mobile phone, a lap top computer or any other mobile terminal device that easily can be moved by a user. The mobile device comprises receiving means 110 configured to receive an image of a physical real world environment taken by at least one camera (not shown) at a position. Using more than one camera may increase the accuracy. The camera may for instance be a camera in a pair of augmented reality goggles, a mobile phone, a digital camera or a HUD, Head Up Display. The receiving means 110 is also configured to receive the position at which the image was taken. The position may for instance consist of coordinates in two or there dimension. Other information may also be added to the position such as for instance in which direction the camera is pointing.

An id is also received by the receiving means 110. The id is associated with an algorithm to be used on the image to extract a set of features from the image. The algorithm may be selected based on the physical real world environment at the position in order to extract features as effectively as possible from an image taken at the position. The selection of the algorithm based on the physical real world environment at different positions is not further described herein since it is considered be common knowledge within the art.

The receiving means 110 is yet further configured to receive a stored set of features for the physical real world environment at the position which has been extracted using the algorithm. The stored set of features may for instance be gradients in an image of the physical real world environment at the position. Yet further means in the mobile device is processing means 120. The processing means 120 is configured to extract the set of features from the image of the physical real world environment using the algorithm. Since the same algorithm has been used to extract the stored set features, received by the receiving means 110, as the set of features, theses both different sets of features can be used to determine if and how the camera is observing an object in the physical real world environment. This determination is performed by the processing means 120 which is further configured to determine if and how the camera is observing an object in the physical real world environment by comparing the stored set of features with the set of features.

The determination of if and how the camera is observing the object performed by the processing means 120 may for instance result in a determination of a more accurate position of the camera in relation to the object in the physical real world environment. The more accurate position may for instance include a direction, a turning and more precise position coordinates for the camera in relation to the object in the physical real world environment.

The receiving means 110 is further configured to receive a virtual image or a virtual object. This virtual image or virtual object is the virtual image or virtual object that should be projected in a visual field of the user. A geometrically correct projection of the virtual image or the virtual object is calculated by the processing means 120 based on how the camera is observing the object in the physical real world environment. The calculation of the geometrically correct projection of the virtual image or virtual object may calculate a projection for each eye. The calculation of the geometrically correct projection of the virtual image or virtual object may also take into account time of year, weather and light conditions at the position in order to calculate a better projection.

The processing 120 may also be configured to predict a future movement of the camera based on a comparison between the stored set of features and the set of features.

The comparison between the stored set of features and the set of features performed by the processing means 120 may be performed on parts of the stored set of features and parts of the set of features.

Figure 2:
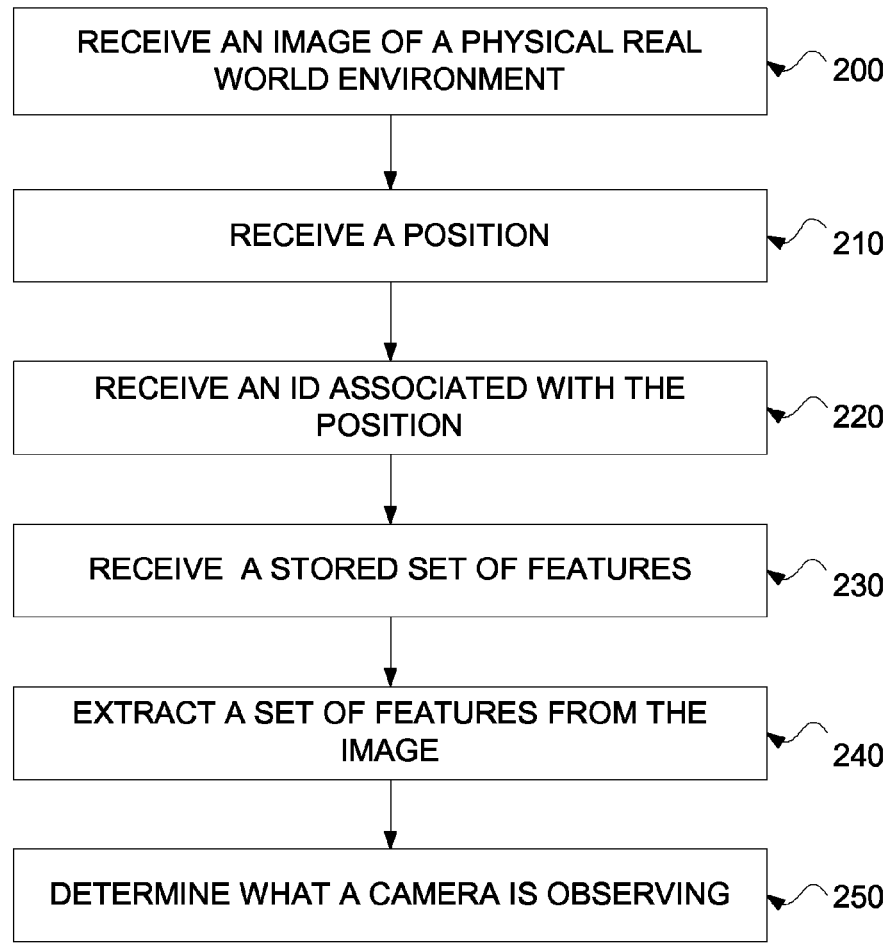
FIG. 2 illustrates a method according to an exemplary embodiment of the present invention.

Referring to FIG. 2 there is illustrated a flowchart of a method in a mobile device 100 for augmented reality describing the steps in accordance with previously described embodiments of the present invention. As shown in FIG. 2, the method comprises:

200 receiving an image of a physical real world environment taken by at least one camera at a position;

210 receiving the position;

220 receiving an id associated with the position, the id being associated with an algorithm to be used on the image to extract a set of features from the image;

230 receiving a stored set of features for the physical real world environment at the position which has been extracted using the algorithm;

240 extracting the set of features from the image using the algorithm; and 250 determining if and how the camera is observing an object in the physical real world environment by comparing the stored set of features with the set of features.

As previously described, the method may comprise a further step of receiving (not shown) a virtual image or a virtual object to be projected in a visual field of a user.

The method may also comprise the further step of calculating (not shown) a geometrically correct projection of the virtual image or the virtual object in the visual field of the user based on how the camera is observing the object in the physical real world environment.

Figure 3:
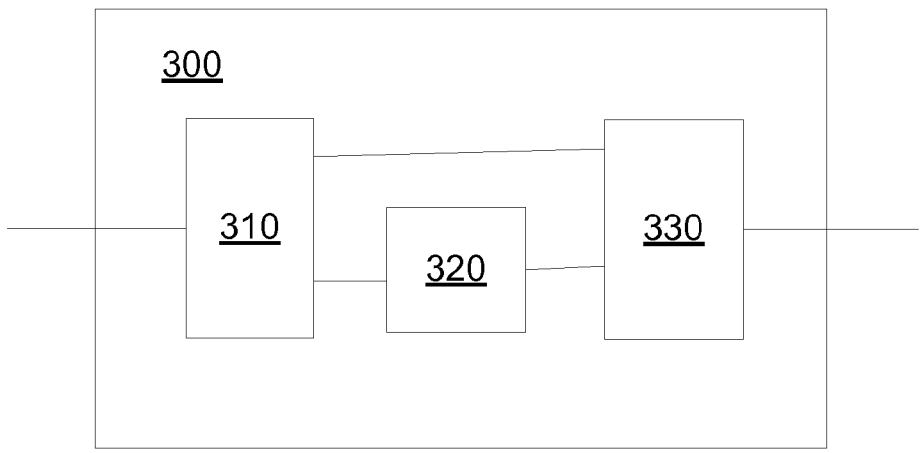
FIG. 3 illustrates schematically a server according to an exemplary embodiment of the invention.

Turning now to FIG. 3, which illustrates an exemplary embodiment of a server 300 according to the present invention. The server comprises receiving means 310 configured to receive an a stored set of features of an image of a physical real world environment taken by at least one camera (not shown) at a position. The camera may for instance be a camera in a pair of augmented reality goggles, a mobile phone, a digital camera or a HUD, Head Up Display. The receiving means 310 is also configured to receive the position at which the image was taken. The position may for instance consist of coordinates in two or three dimension. Other information may also be added to the position such as for instance in which direction the camera is pointing.

The server 300 further comprises retrieving means 320. The retrieving means 320 is configured to retrieve an id associated with the position. The id is associated with an algorithm to be used on the image to extract a set of features from the image. The algorithm has been selected based on the physical real world environment at the position in order to extract features as effectively as possible from an image taken at the position. The selection of the algorithm based on the physical real world environment at different positions is not further described herein since it is considered be common knowledge within the art.

The retrieving means 320 is yet further configured to retrieve a stored set of features for the physical real world environment at the position which has been extracted using the algorithm. The stored set of features may for instance be gradients in an image of the physical real world environment at the position. Yet further means in the server 300 is processing means 330. Since the same algorithm has been used to extract the stored set features, retrieved by the retrieving means 320, as the set of features received by the receiving means 310, theses both different sets of features can be used to determine if and how the camera is observing an object in the physical real world environment. This determination is performed by the processing means 330 which is further configured to determine if and how the camera is observing an object in the physical real world environment by comparing the stored set of features with the set of features.

The determination if and how the camera is observing the object performed by the processing means 330 may for instance result in a determination of a more accurate position of the camera in relation to the object in the physical real world environment. The more accurate position may for instance include a direction, a turning and more precise position coordinates for the camera in relation to the object in the physical real world environment.

The retrieving means 320 is further configured to retrieve a virtual image or a virtual object. This virtual image or virtual object is the virtual image or virtual object that should be projected in a visual field of the user.

A geometrically correct projection of the virtual image or the virtual object is calculated by the processing means 330 based on how the camera is observing the object in the physical real world environment.

The image retrieved by the retrieving means 320 may be taken by at least one camera, where the at least one camera may be a camera in a pair of augmented reality goggles, a mobile phone, a digital camera or a HUD, Head Up Display.

The calculation of the geometrically correct projection of the virtual image or virtual object may calculate a projection for each eye. The calculation of the geometrically correct projection of the virtual image or virtual object may also take into account time of year, weather and light conditions at the position in order to calculate a better projection.

The processing 330 may also be configured to predict a future movement of the camera based on a comparison between the stored set of features and the set of features.

The comparison between the stored set of features and the set of features performed by the processing means 330 may be performed on parts of the stored set of features and parts of the set of features.

Figure 4:
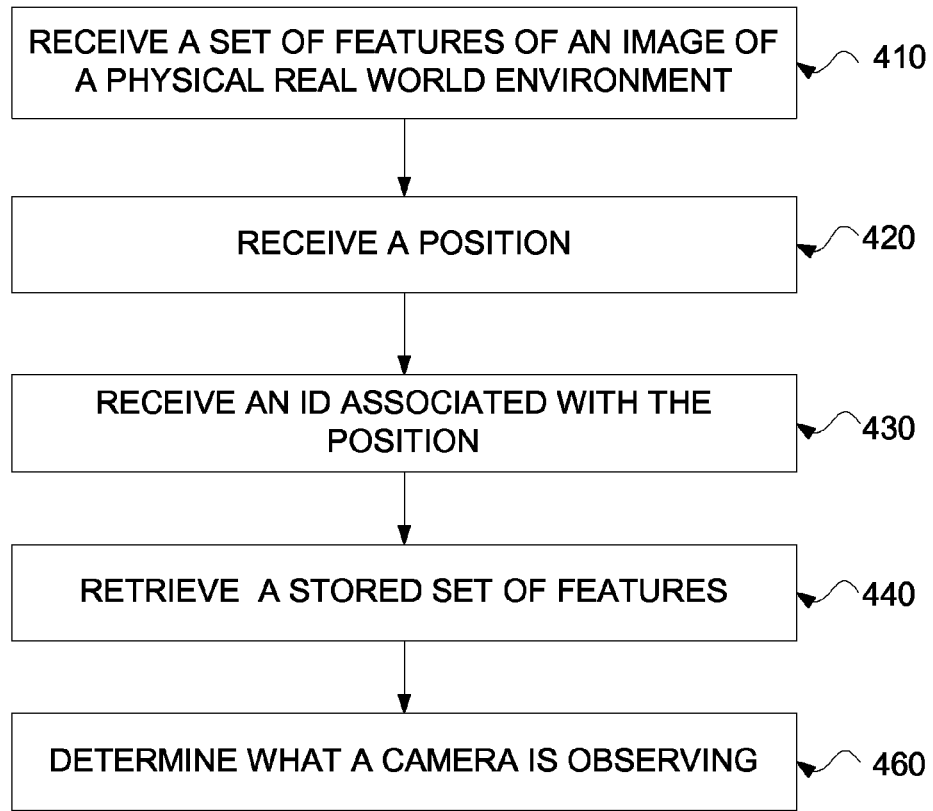
FIG. 4 illustrates a method according to an exemplary embodiment of the present invention.

Referring to FIG. 4 there is illustrated a flowchart of a method in the server 300 for augmented reality describing the steps in accordance with previously described embodiments of the present invention. As shown in FIG. 4, the method comprises:

410 receiving a stored set of features of an image of a physical real world environment at a position taken by at least one camera;

420 receiving the position;

430 retrieving an id associated with the position, the id being associated with an algorithm to be used on the image to extract a set of features from the image;

440 retrieving a stored set of features for the physical real world environment at a position, which has been extracted using the algorithm; and 460 determining if and how the camera is observing an object in the physical real world environment by comparing the stored set of features with the set of features.

As previously described, the method may comprise a further step of retrieving (not shown) a virtual image or a virtual object to be projected in a visual field of a user.

The method may also comprise the further step of calculating (not shown) a geometrically correct projection of the virtual image or the virtual object in the visual field of the user based on how the camera is observing the object in the physical real world environment.

Note that the even if the present invention has been described using one image the present invention may be performed using two or more images taken by different cameras. In theses embodiments the image that gives the best result may be used. The image that for instance results in the set of features containing the most unique data may for instance be used.

While the present invention has been described with respect to particular embodiments (including certain device arrangements and certain orders of steps within various methods), those skilled in the art will recognize that the present invention is not limited to the specific embodiments described and illustrated herein. Therefore, it is to be understood that this disclosure is only illustrative. Accordingly, it is intended that the invention be limited only by the scope of the claims appended hereto.

The invention claimed is:

1. A mobile device for augmented reality, the mobile device comprising:
   a receiver configured to receive an image of a physical real world environment taken by at least one camera at a position, said receiver being further configured to receive said position, said receiver being further configured to receive an id, where said id being associated with an algorithm to be used on said image to extract a set of features from said image, said receiver being further configured to receive a stored set of features for said physical real world environment at said position which has been extracted using said algorithm; and
   a processor configured to extract said set of features from said image using said algorithm; and to determine if and how said camera is observing an object in said physical real world environment by comparing said stored set of features with said set of features.

2. The mobile device according to claim 1, wherein said receiver is further configured to receive a virtual image or a virtual object to be projected in a visual field of a user.

3. The mobile device according to claim 2, wherein the processor is further configured to calculate a geometrically correct projection of the virtual image or the virtual object in the visual field of the user based on how said camera is observing the object in the physical real world environment.

4. The mobile device according to claim 1, wherein said at least one camera is a camera in a pair of augmented reality goggles, a mobile phone, a digital camera or a HUD, Head Up Display.

5. The mobile device according to claim 1, wherein said algorithm has been chosen based on said physical real world environment at said position.

6. The mobile device according to claim 1, wherein said processor is further configured to compare parts of said stored set of features with parts of said set of features.

7. A method in a mobile device for augmented reality, the method comprising:
receiving an image of a physical real world environment taken by at least one camera at a position;
receiving said position;
receiving an id associated with said position, said id being associated with an algorithm to be used on said image to extract a set of features from said image;
receiving a stored set of features for said physical real world environment at said position which has been extracted using said algorithm;
extracting said set of features from said image using said algorithm; and
determining if and how said camera is observing an object in said physical real world environment by comparing said stored set of features with said set of features.

8. The method according to claim 7, further comprising:
receiving a virtual image or a virtual object to be projected in a visual field of a user.

9. The method according to claim 8, further comprising:
calculating a geometrically correct projection of said virtual image or said virtual object in the visual field of the user based on how said camera is observing the object in the physical real world environment.

10. The method according claim 7, wherein said at least one camera is a camera in a pair of augmented reality goggles, a mobile phone, a digital camera or a HUD, Head Up Display.

11. The method according to claim 7, wherein said algorithm has been chosen based on said physical real world environment at said position.

12. The method according to claim 7, wherein parts of said stored set of features are compared with parts of said set of features in said determining.

13. A server for augmented reality, the server comprising:
a receiver configured to receive a set of features extracted from an image of a physical real world environment taken by at least one camera at a position and said position;
a retriever configured to retrieve an id associated with said position, said id being associated with an algorithm that has been used to extract said set of features from said image, and said retriever being further configured to retrieve a stored set of features for said physical real world environment at said position, which has been extracted using said algorithm; and
a processor configured to determine if and how said camera is observing an object in said physical real world environment by comparing said stored set of features with said set of features.

14. The server according to claim 13, wherein said retriever is further configured to retrieve a virtual image or a virtual object to be projected in a visual field of a user.

15. The server according to claim 14, wherein said processor is further configured to calculate a geometrically correct projection of the virtual image or the virtual object in the visual field of the user based on how said camera is observing the object in the physical real world environment.

16. The server according to claim 13, wherein said at least one camera is a camera in a pair of augmented reality goggles, a mobile phone, a digital camera or a HUD, Head Up Display.

17. The server according to claim 13, wherein said algorithm has been chosen based on said physical real world environment at said position.

18. The server according to claim 13, wherein said processor is further configured to compare parts of said stored set of features with parts of said set of features.

19. A method in a server for augmented reality, the method comprising:
receiving a set of features extracted from an image of a physical real world environment at a position taken by at least one camera;
receiving said position;
retrieving an id associated with said position, said id being associated with an algorithm that has been used on said image to extract a set of features from said image;
retrieving a stored set of features for said physical real world environment at a position, which has been extracted using said algorithm; and
determining if and how said camera is observing an object in said physical real world environment by comparing said stored set of features with said set of features.

20. The method according to claim 19, further comprising:
retrieving a virtual image or a virtual object to be projected in a visual field of a user.

21. The method according to claim 20, further comprising:
calculating a geometrically correct projection of said virtual image or said virtual object in the visual field of the user based on how said camera is observing the object in the physical real world environment.

22. The method according to claim 19, wherein said at least one camera is a camera in a pair of augmented reality goggles, a mobile phone, a digital camera or a HUD, Head Up Display.

23. The method according to claim 19, wherein said algorithm has been chosen based on said physical real world environment at said position.

24. The method according to claim 19, wherein parts of said stored set of features are compared with parts of said set of features in said determining.

* * * * *